United States Patent [19]

Kawakatsu

[11] 4,071,358

[45] Jan. 31, 1978

[54] HEAT RESISTING COPPER BASE BRAZING FILLER METAL

[75] Inventor: Ichiro Kawakatsu, Tokyo, Japan

[73] Assignee: Kabushiki Kaisha Komatsu Seisakusho, Tokyo, Japan

[21] Appl. No.: 769,097

[22] Filed: Feb. 16, 1977

[51] Int. Cl.² .................. C22C 9/05; C22C 9/06; C22C 9/02
[52] U.S. Cl. ................................ 75/154; 75/153
[58] Field of Search .............. 75/153, 154, 159, 161, 75/156, 156.5, 157

[56] References Cited

U.S. PATENT DOCUMENTS

| | | | |
|---|---|---|---|
| 1,656,696 | 1/1928 | Deeter | 75/154 |
| 2,117,106 | 5/1938 | Silliman | 75/159 |
| 2,988,447 | 6/1961 | Hoppin | 75/159 |
| 3,198,609 | 8/1965 | Cape | 75/161 |

FOREIGN PATENT DOCUMENTS 1,208,721  10/1970  United Kingdom .................. 75/161

*Primary Examiner*—C. Lovell
*Attorney, Agent, or Firm*—Armstrong, Nikaido & Marmelstein

[57] ABSTRACT

A heat resisting copper base brazing filler metal consisting essentially of by weight percent, 10 to 20 manganese, 2 to 10 nickel, 0.5 to 4.0 tin, 0.5 to 4.0 indium and balance copper. The brazing filler metal provides sound, tight joints with excellent strength retention at elevated temperatures.

3 Claims, 5 Drawing Figures

HEAT RESISTING COPPER BASE BRAZING FILLER METAL

BACKGROUND OF THE INVENTION

This invention relates to a copper base brazing filler metal alloy which has excellent heat resistance.

High performance heat exchangers have been widely used in order to recover heat energy in waste gas to economize consumption of fuels. Since such kinds of heat exchanger are manufactured by brazing, it is required that the brazing filler metals used is cheap and has a sufficient heat resisting property.

As the heat resisting brazing filler metal, palladium alloys, gold alloys and nickel alloys have been generally known. However, the palladium brazing filler metals and the gold brazing fillet metals are expensive and can not be industrially used, because they include a large amount of noble metals. Further, since the nickel base brazing filler metals are available only as powder states due to their low processing properties, application thereof to places to be brazed takes much time thereby remarkably reducing the productivity.

On the other hand, if a foil brazing filler metal is used, the productivity becomes high, because the brazing filler metal may be merely applied between places to be brazed at assembling. The nickel base brazing filler metals have very excellent heat resisting properties, however, in cases of using the nickel base brazing filler metal for the above noted heat exchangers, the heat resistance thereof is too excellent considering the heat exchangers being operated at a gas temerature of 750° C or less. Accordingly, it has been desired to provide a novel brazing filler metal which is cheap and has a good processing property even if the heat resistance thereof is not so good as that of the nickel base brazing filler metals.

As the result of various studies from such a viewpoint, the present inventors have developed a copper-manganese brazing filler metal and a copper-manganese-nickel brazing filler metal. These brazing filler metals have heat resisting properties for practicable use. Further, a brazing property thereof is good enough, if the brazing is carried out under vacuum.

However, if the brazing is carried out under a certain atmosphere, for example, in hydrogen, such brazing filler metals have defects that oxides of manganese are yielded to cause poor brazing.

Further, such brazing filler metals, which are used mainly for brazing stainless steels etc. have defects that brazed joints will become weak to cause decrease of strength when they are held at an elevated temperature such as 650° C for a long time. It is further desired to improve the heat resisting property thereof because of being somewhat unsatisfactory for it.

SUMMARY OF THE INVENTION

It is, therefore, an object of the present invention to provide a heat resisting copper base brazing filler metal which can overcome the above noted deficiencies.

Another object of the present invention is to provide a heat resisting copper base brazing filler metal which produces sound, tight joints with excellent strength retention after holding at elevated temperatures.

It is still another object of the present invention to provide a heat resisting copper base brazing filler metal with excellent oxidation and the corrosion resistance.

According to the present invention, there is provided a heat resisting copper base brazing filler metal consisting of by weight percent, 10 to 20 manganese, 2 to 10 nickel, 0.5 to 4.0 tin, 0.5 to 4.0 indium and balance copper.

Other objects, features and advantages of the present invention will be readily apparent from the following description taken in conjunction with the accompanying drawings.

DETAILED DESCRIPRION OF THE PREFERRED EMBODIMENTS

The present invention provides a Cu-Mn-Ni-Sn-In alloy. Reasons of deciding the composition range of the present invention will now be described hereinafter.

Considering brazing equipments and brazing costs, it is preferred that the brazing temperature is as low as possible. It is particularly desirable that the brazing temperature is lower than 1000° C, because the brazing cost becomes higher if brazing is performed above 1000° C. Since the brazing temperature must be at least 30° C higher than a melting point of a brazing filler metal it is necessary that the melting point of the brazing filler metal is below 970° C.

Figure 1:
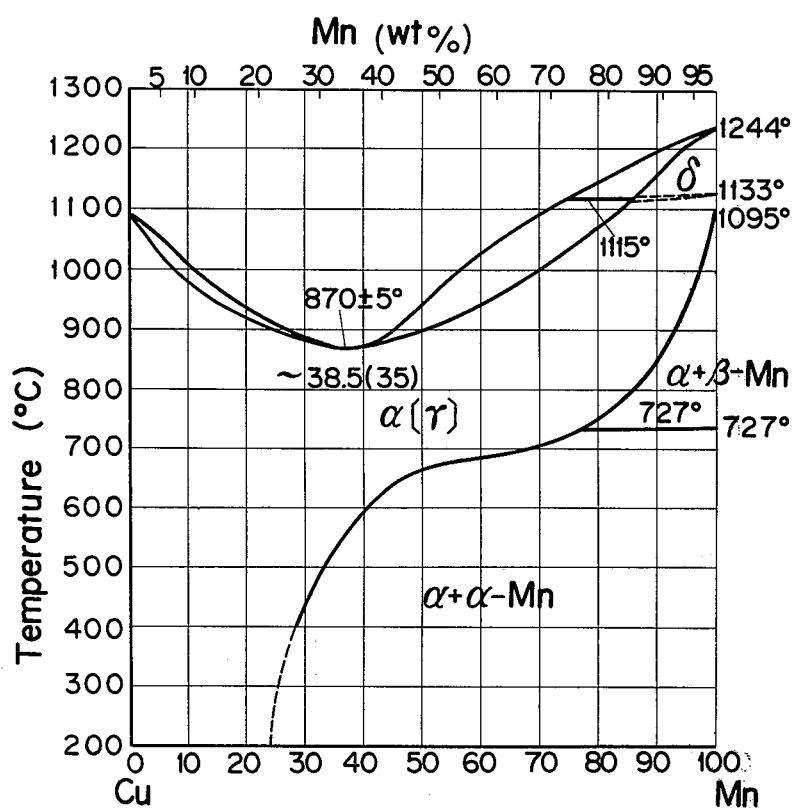
FIG. 1 is a Cu-Mn phase diagram.

Referring to the Cu-Mn phase diagram of FIG. 1, the melting point will decrease by addition of Mn to Cu. If 10% Mn is added, the melting point becomes below 1000° C. Though melting point becomes minumum (about 870° C) by addition of 35% Mn, oxidized films are formed by oxidation of Mn to deteriorate brazing properties. Accordingly, Mn content in the brazing filler metal of the present invention should be up to 20%. Though the melting point is about 1000° C in cases of 10% Mn according to the Cu-Mn Phase diagram, it becomes below 970° C considering the effect of addition of other elements (i.e. Sn and In).

Further, the heat resisting property and the anti-oxidizing property are less improved, if the content of Mn is smaller. Accordingly, the content of Mn should be above 10%. As described above, if the content of Mn is above 20%, the brazing property in atmosphere is deteriorated. When brazing is carried out using Cu-Mn and Cu-Mn-Ni brazing filler metals having 25% of the Mn content, in a hydrogen atmosphere (the dew point −60° C or less), dark green manganese oxides are formed on the surfaces of brazing filler metals flowing of the brazing filler metals become inferior resulting in poor brazing. Accordingly, an optimum content of Mn is about 10–20% by weight and preferably about 12–17% by weight.

Ni improves mechanical properties in elevated temperatures, however, less than 2% of Ni produces a little effect. Accordingly, it is necessary Ni be added in the amount of more than 2%. Melting points of the brazing filler metals having a base composition consisting of 15% Mn, 2% Si, 2% In and the balance Cu to which Ni is added are shown in the following table.

TABLE I

| Ni wt% | 0 | 5.0 | 10 |
|---|---|---|---|
| Melting point ° C | 925 | 952 | 971 |

According to Table 1, Ni content should be 10% or less in order to reduce the brazing temperature under 970° C. Accordingly, Ni content is about 2% to 10% and more preferably about 5 to 8%.

Figure 2:
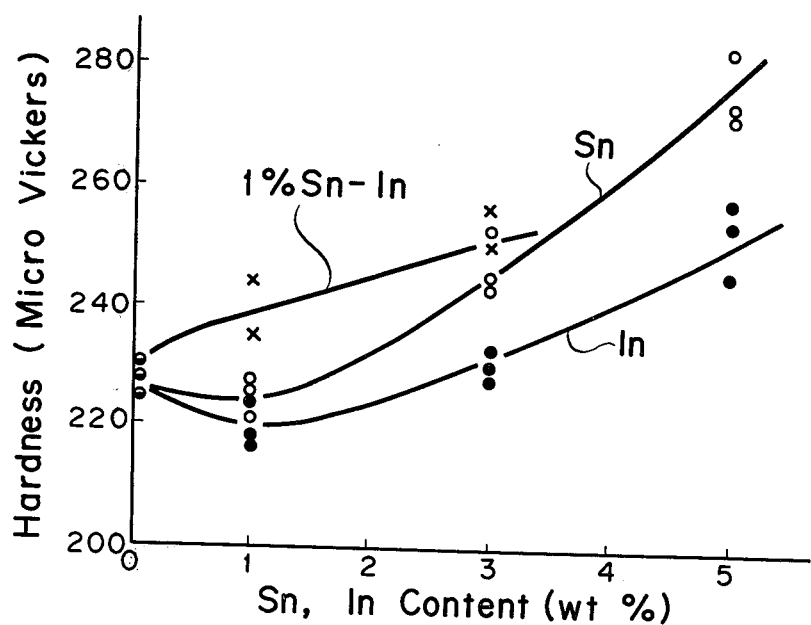
FIG. 2 ia a graph showing a relationship between tin and/or indium contents and hardness of copper base alloys with 15 wt% manganese and 5 wt% nickel.
Figure 3:
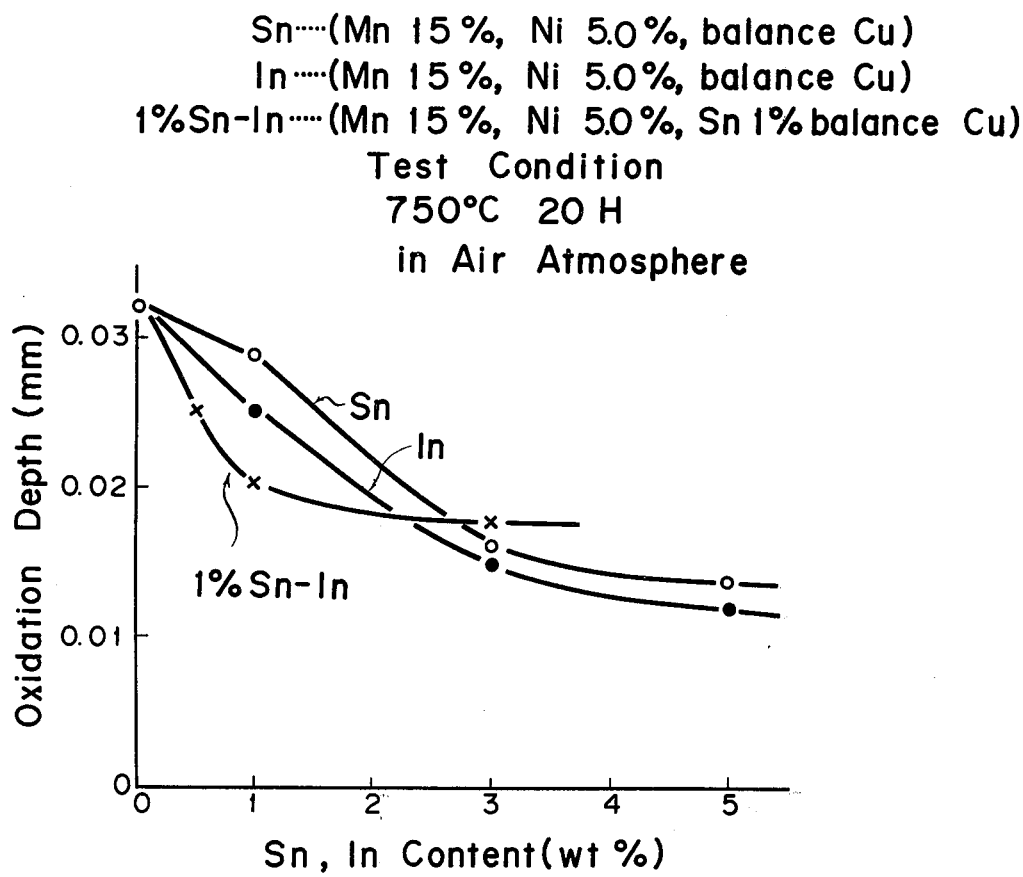
FIG. 3 is a graph showing a relationship between tin and/or indium contents and depth of oxdation of copper base alloys with 15 wt% manganese and 5 wt% nickel.

Addition of indium and tin lowers the melting point and improves the brazing property as well as anti-oxidizing property. It will be understood with reference to FIG. 2 that if the contents of In and Sn increase, hardness of the alloy becomes high and the processing property is deteriorated. Referring to FIG. 3, if the contents of In and Sn increase, the anti-oxidizing property is improved. However, when Sn and In are included over 4% by weight, improvements to the properties can hardly be attained. Accordingly, in the present invention, contents of Sn and In should be each about 0.5 to 4%. In comparison of the 1% Sn-In curve with the In curve in FIGS. 2 and 3, the most preferred results in hardness and oxidation depth are obtained in a range of In: 1 - 3% of the 1% Sn-In curve. Accordingly, more preferably Sn and In contents are each about 1.0 to 3.0%.

Figure 4:
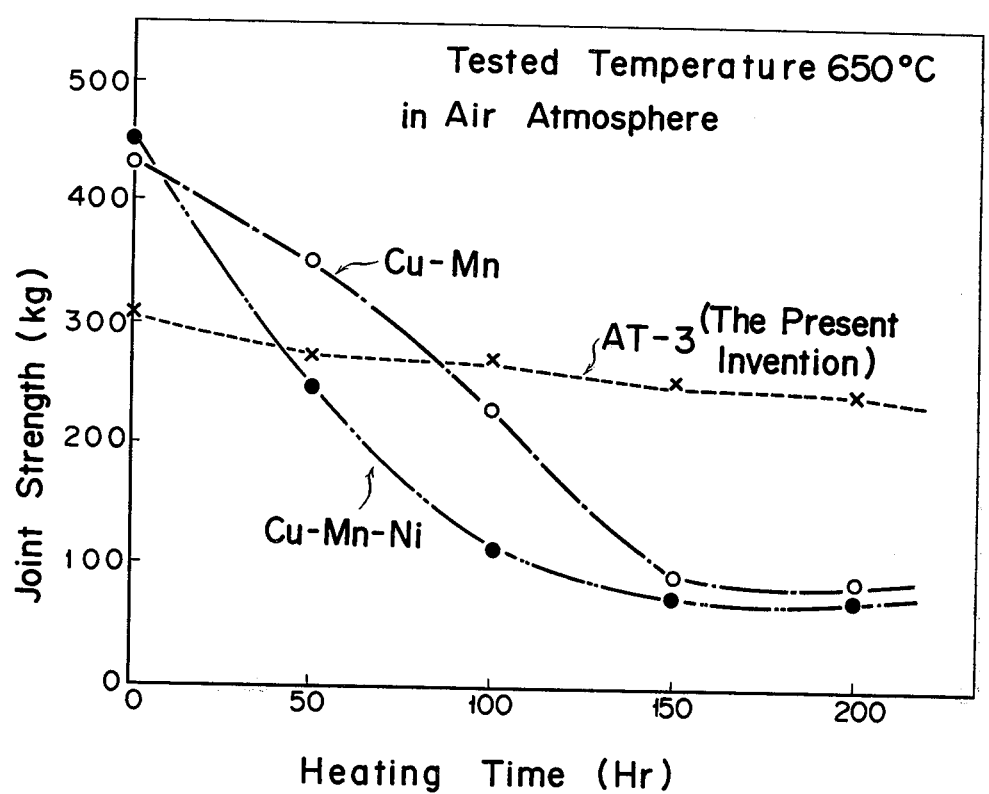
FIG. 4 is a graph comparing heat resisting property of the alloy of the present invention and that of the conventional brazing filler metals.

FIG. 4 is a graph comparing joint strength of the brazing filler metal of the present invention at a normal temperature after heated to 650° C with that of the copper-manganese brazing filter metal and that of copper-manganese-nickel brazing filler metal.

Figure 5:
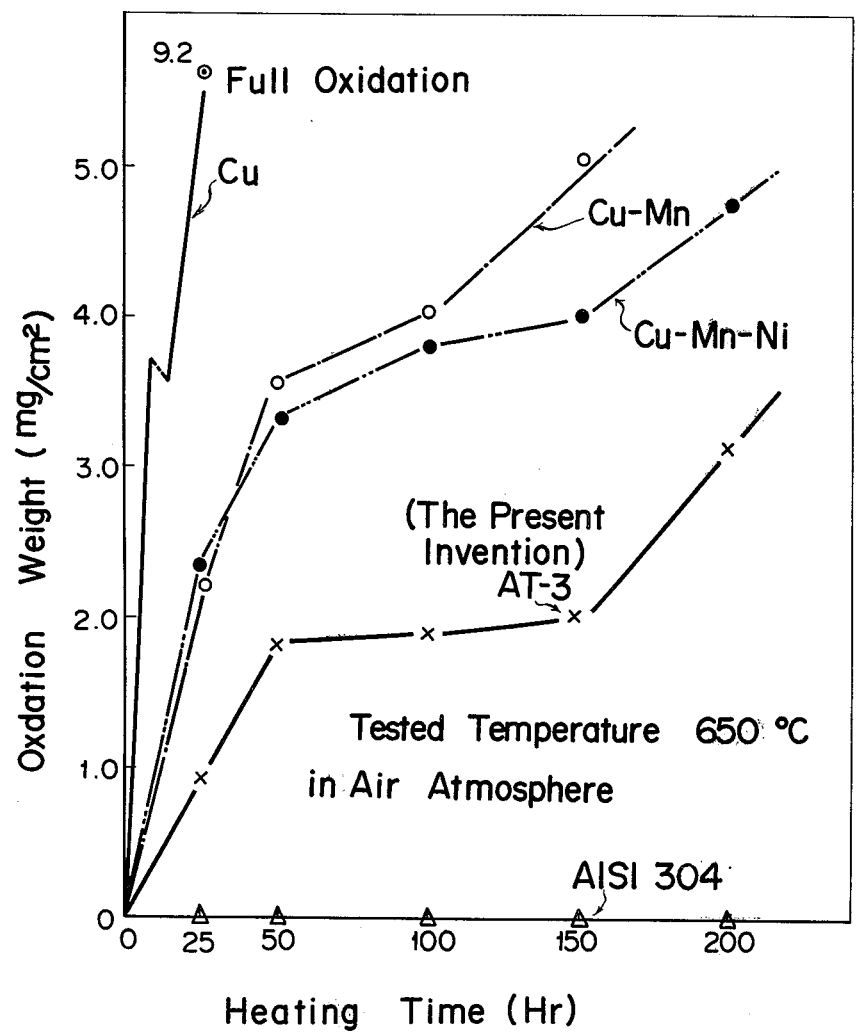
FIG. 5 is a graph comparing oxidation resisting property of the alloy of the present invention and that of the conventional brazing filler metals.

FIG. 5 is a graph comparing the anti-oxidizing property of the brazing filler metal of the present invention in air atmosphere at 650° C with that of the copper-manganese brazing filler metal, that of the copper-manganese-nickel brazing filler metal and that of pure copper. For carrying out the above tests, materials shown in the following table are used.

TABLE II

| Species of Brazing Filler Metal | Cn | Mn | Ni | Sn | In |
|---|---|---|---|---|---|
| At - 3 | 76.0 | 15.0 | 5.0 | 2.0 | 2.0 |
| Cu - Mn | 75.5 | 25.0 | — | — | — |
| Cu - Mn - Ni | 65.0 | 25.0 | 10.0 | — | — |

As being understood from the graph, joint strength of the brazing filler metal (AT-3) of the present invention, will hardly decrease even if it is allowed to be exposed at a temperature as high as 650° C for 200 hours. On the contrary, in the Cu-Mn alloy or the Cu-Mn-Ni alloy, the joint strength will be drastically decreased by the lapse of time and finally reaches to a quarter. It is further understood from FIG. 4 that an oxidized amount of the brazing filler metal of the present invention is remarkably less than that of other brazing filler metals.

Since various changes and modifications of the invention will occur to and can be made readily by those skilled in the are without departing from the concept of the invention, the invention is not to be limited to except by the scope of the appended claims.

What is claimed is:

1. A heat resisting copper base brazing filler metal consisting essentially of by weight percent, about 10 to 20 manganese, about 2 to 10 nickel, about 0.5 to 4.0 tin, about 0.5 to 4.0 indium and balance copper.

2. A heat resisting copper base brazing filler metal of claim 1 wherein tin is about 1.0 to 3.0 weight percent and indium is about 1.0 to 3.0 weight percent.

3. A heat resisting copper base brazing filler metal consisting essentially of by wight percent, about 12 to 17 manganese, about 5 to 8 nickel, about 1.0 to 3.0 tin, about 1.0 to 3.0 indium and balance copper.

* * * * *